United States Patent [19]
de Haan et al.

[11] Patent Number: 5,057,919
[45] Date of Patent: Oct. 15, 1991

[54] PICTURE SIGNAL INTERPOLATION CIRCUIT WITH GAMMA COMPENSATION

[75] Inventors: Gerard de Haan; Gerrit F. M. de Poortere; Johannes P. J. Tielemans, all of Eindhoven, Netherlands

[73] Assignee: U.S. Philips Corporation, New York, N.Y.

[21] Appl. No.: 505,209

[22] Filed: Apr. 4, 1990

[30] Foreign Application Priority Data

Apr. 12, 1989 [NL] Netherlands ............... 8900909

[51] Int. Cl.$^5$ ............... H04N 7/12; H04N 9/69; H04N 5/202; H04N 9/79
[52] U.S. Cl. ............... 358/136; 358/32; 358/164; 358/313; 358/336; 360/11.1
[58] Field of Search ............... 358/313, 32, 140, 164, 358/336, 135, 136, 141; 360/11.1

[56] References Cited

U.S. PATENT DOCUMENTS

| | | | |
|---|---|---|---|
| 3,886,589 | 5/1975 | Nasu | 360/11.1 |
| 4,298,896 | 11/1981 | Heitmann | 360/11.1 |
| 4,412,251 | 10/1983 | Tanaka et al. | 358/160 |
| 4,641,202 | 2/1987 | Nakamura et al. | 360/11.1 |
| 4,783,703 | 11/1988 | Murakoshi et al. | 358/313 |
| 4,962,419 | 10/1990 | Hibbard et al. | 358/41 |

Primary Examiner—John K. Peng
Attorney, Agent, or Firm—Michael E. Marion

[57] ABSTRACT

A picture signal source (PSS) comprises an encoding circuit (ENC) for encoding a picture signal having a higher bandwidth to a picture signal having a lower bandwidth. Encoding is effected in dependence upon the extent of motion in the picture which is determined by a motion detection device (MOT). An encoding has been given as an example, using several picture signal channels (PC1, PC2, PC3) each having a different picture signal refreshing period of, for example 80, 20 or 40 ms. The so-called field skipping method is used for which a switching circuit (SC4) switching at the frame frequency is provided. The picture display device (PDD) comprises an essentially complementary, inversely operative decoding circuit (DEC) with a motion-compensated (VR') picture signal interpolation circuit (MEM, INT, G) which comprises a gamma compensation circuit (G) according to the invention. Without this circuit a troublesome area flickering may occur upon display in practice. The gamma compensation circuit (G) counteracts the area flickering which is caused by a combination of the act that the picture signal is gamma-corrected (COR.γ.), the use of the field skipping method (SC4) and the presence of considerable pixel contrasts.

10 Claims, 3 Drawing Sheets

PICTURE SIGNAL INTERPOLATION CIRCUIT WITH GAMMA COMPENSATION

BACKGROUND OF THE INVENTION

The invention relates to picture signal interpolation circuit, comprising:

means for receiving a picture signal encoded in accordance with a field skipping method, and means for interpolating said picture signal to obtain interpolated fields between received fields of said picture signal.

A television system in which an original picture signal bandwidth is higher than a bandwidth of a transmission path is used, for example, in high-definition television for, inter alia broadcasting stations, in television conference systems, in television for monitoring purposes using telephone connections, etc. For picture signal storage, storage on discs or tapes having a more limited capacity is mentioned as an example.

A high-definition television system comprising in its decoding section a picture signal interpolation circuit as described in the preamble, is known from a discourse at a conference and an accompanying article entitled "TVDH 87", Ottawa (CA) 4–8 October 1987, vol. 1, P. Bernard et al.:"Analyse de structures de sousechantillonnage spatio-temporel d'un signal TVHD en vue de sa transmission dans un canal MAC" pp. 6.2.2–6.2.28". The introduction of high-definition television (HDTV) for domestic use is described for color television. Starting from the so-called MAC system (Multiplexed Analog Components) having its limited bandwidth, a compatible high-definition system (HD-MAC) is described. It is stated that there must be a balance between, on the one hand, the best HD-MAC picture available for specific receivers and, on the other hand, the capability of maintaining an acceptable quality for existing MAC receivers. To this end it has been proposed to use three picture signal channels with a shortest, an intermediary and a longest picture signal refreshing period, the shortest period being equal to 20 ms, in the encoding circuit and in the complementary, i.e., inversely operative decoding circuit. Dependent on the result of motion detection, one of the three channels is used locally in the picture. In the case of a motion of more than 2 pixels per frame period (20 ms) the channel having the shortest period is used. In the case of a motion between 2 and 0.5 pixels per frame period, the channel having the intermediary period is used and in the case of a motion over less than 0.5 pixel per frame period, the channel having the longest period is used. For obtaining the picture signal bandwidth reduction use is thus made of the split-up into sub-pictures which are stationary or which exhibit some motion or much motion.

In addition to the encoding operation which leads to the reduction of the bandwidth, it is well known to limit the bandwidth by means of the so-called field skipping method in which e.g. one of two successive fields is transmitted or stored each time. In this case the picture signal interpolation circuit operates with picture information from the previous and the subsequent field so as to form the non-stored or non-transmitted intermediate field by means of the interpolation.

In practice it appears that a non-optimum picture quality may occur during picture signal display when using the combination of encoding and field skipping. It appears that a troublesome area flickering may occur.

SUMMARY OF THE INVENTION

It is inter alia an object of the invention to realise a picture signal interpolation circuit by which the troublesome area flickering is reduced. To this end a picture signal interpolation circuit according to the invention is characterized in that the picture signal interpolation circuit is provided with a gamma compensation circuit.

The invention is based inter alia on the recognition that the combination of the fact that the picture signal is gamma-corrected, the use of the field skipping method and the presence of considerable pixel contrasts contributes to the area flickering. The remedy found is the use of the gamma compensation circuit in the picture signal interpolation circuit so that large contrasts in the displayed picture no longer contribute to the troublesome area flickering. The contribution to the area flickering caused by said combination occurs at half the field frequency, i.e. the frame frequency, due to the periodical alternation, upon display, of received field information and interpolated field information.

An embodiment of a picture signal interpolation circuit according to the invention, is characterized in that the picture signal interpolating means include a picture signal memory having a memory capacity or delay time which is equal to or larger than two field periods and an interpolator which is coupled to output and input of the memory.

A further embodiment of a picture display device according to the invention is characterized in that the gamma compensation circuit comprises a first and a second degamma corrector each having an output coupled to a respective input of the interpolator. As a result, the interpolator operates with linearized picture signal so that the area flickering upon display is reduced.

If a picture display device comprising the picture signal interpolation circuit, has a picture display member with a gamma which is unequal to one, the picture signal interpolation circuit according to the invention may be further characterized in that the gamma compensation circuit comprises a gamma corrector an input of which is coupled to an output of the interpolator. A gamma adaptation at this location results in the simplest embodiment.

An embodiment of a picture signal interpolation circuit operating with a compensation value which is dependent on the pixel contrast at the picture interpolation is characterized in that the gamma compensation circuit comprises a digital subtractor inputs of which are coupled to inputs of the interpolator, an output of the subtractor being coupled to an absolute value former and multiplier, an output of which is coupled to an input of an adder, another input of which is coupled to an output of the interpolator.

Experiments have shown that optimum results are obtained if the multiplier has a multiplication factor of the order of one eighth.

An embodiment of a picture signal interpolation circuit operating with a compensation value which is dependent on the pixel contrast at the picture interpolation and on the local brightness in the picture, is characterized in that the gamma compensation circuit comprises a digital subtractor, inputs of which are coupled to inputs of the interpolator, an output of the subtractor being coupled to an absolute value former, an output of which is coupled to an input of a digital device having a look-up table, another input of said digital device being coupled to an output of the interpolator, and an output of said digital device being coupled to an input of an adder, another input of which is coupled to said interpolator output.

These and other (more detailed) aspects of the invention will now be described and elucidated in greater detail by way of example with reference to the accompanying drawings.

DETAILED DESCRIPTION OF PREFERRED EMBODIMENTS OF THE INVENTION

Figure 1:
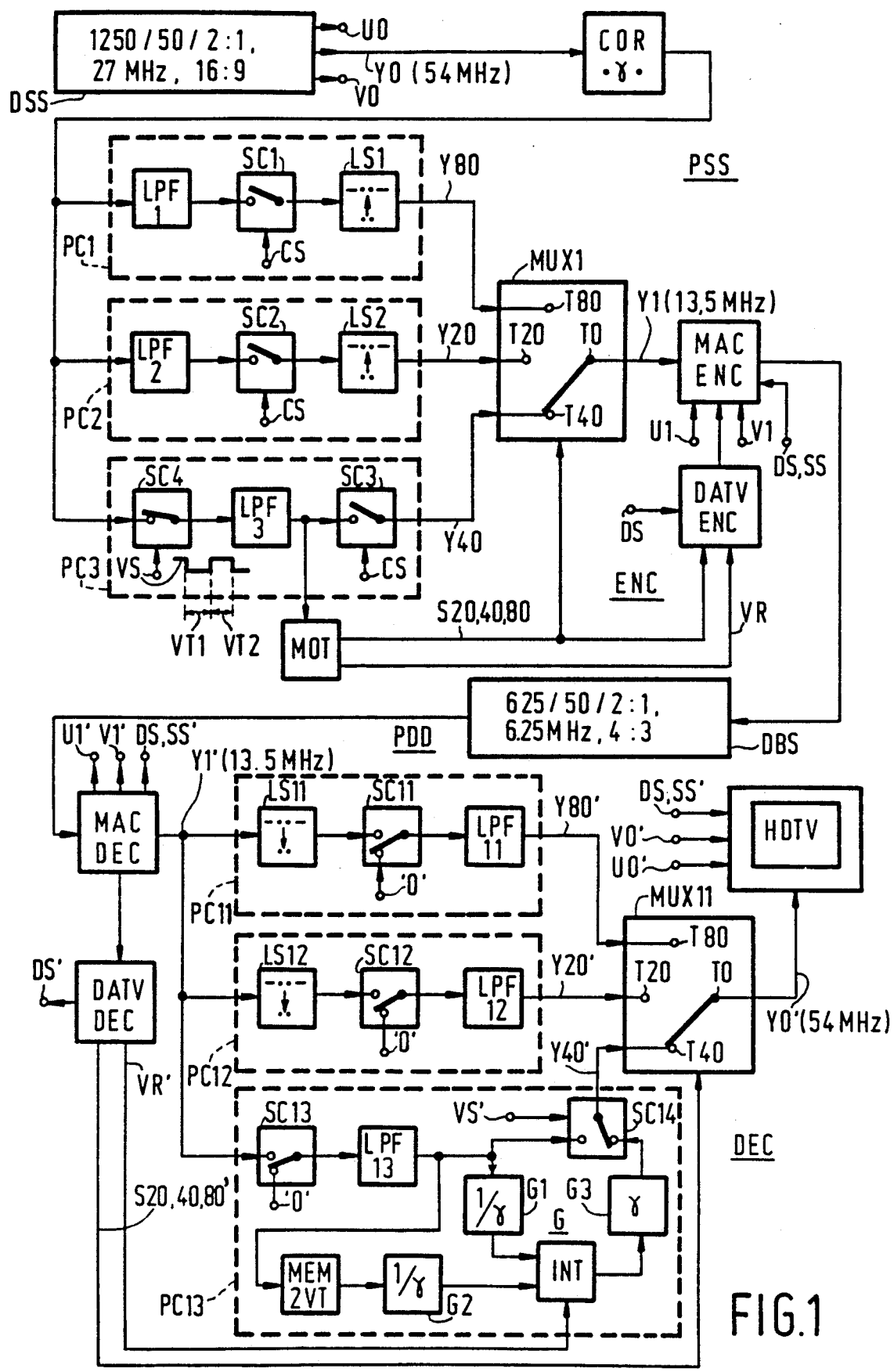
FIG. 1 is a block-schematic diagram of an embodiment of a television system and of a picture display device comprising a picture signal interpolation circuit according to the invention.

FIG. 1 shows by way of example a block-schematic diagram for a television system comprising in its decoding part a picture signal interpolation circuit according to the invention, particularly implemented as a high-definition HD-MAC color television system, which is illustrated with a MAC encoding circuit MAC ENC and with the indication 1250/50/2:1, 27 MHz, 16:9 in a signal source DSS. It has been indicated at the, for example, digital signal source DSS that it supplies a luminance signal YO (54 MHz) and chrominance signals UO and VO, in which 54 MHz is the sampling frequency at the luminance signal YO with the original picture signal bandwidth of 27 MHz. The digital signal YO (54 MHz) is, for example an 8-bit signal, similarly as the signals UO and VO. For the sake of completeness of the description of the HD-MAC system of FIG. 1, the signals UO and VO are given which are assumed to be processed in the desired known manner to signals U1 and V1 to be applied to the encoding circuit MAC ENC. The circuit MAC ENC ensures in known manner a signal compression and a simultaneous sequential conversion of the applied picture signals. In the signal source DSS the number 1250 indicates, for example, the number of television lines per frame period, in which 50 single interlaced (2:1) fields with a field period of 20 ms constitute 25 frames. In this case a television line period which is not indicated, is equal to 32 μs. The signal source DSS could further supply a non-interlaced picture signal with, for example, the associated indication 1250/50/1:1. The proportion of the picture, i.e. the aspect ratio is indicated by 16:9.

The reference PSS denotes the picture signal source of the television system which comprises mainly the source DSS and an encoding circuit ENC for the system. Picture signal source PSS is coupled to a picture signal transmission path or picture signal storage device which is denoted by DBS. An example of the storage device is a disc or tape picture signal recording and reproducing device. Starting from the HD-MAC system, which is given by way of example, the transmission path is further described, with the reference DBS standing for "Direct Broadcast by Satellite". In a comparable manner the indication 625/50/2:1, 6.25 MHz, 4:3 is given by way of example in the transmission path DBS, similarly as in the source DSS. It appears that the original picture signal bandwidth of 27 MHz is a factor of four larger than the limited bandwidth of 6.25 MHz of the transmission path DBS. The output of the transmission path DBS is coupled to at least one picture display device PDD forming part of the system. The device PDD mainly comprises a decoding circuit DEC for the system, which circuit is essentially complementary, inversely operative with respect to the system encoding circuit ENC of the picture signal source PSS. The circuit DEC forms from the picture signal received via the path DBS a picture signal YO' (54 MHz) to be applied to a high-definition picture display member HDTV. The chrominance signals UO' and VO' and data and sound signals DS, SS' originating from a MAC DEC decoding circuit are applied in known manner to the picture display member HDTV. The MAC DEC circuit is essentially complementary to the MAC ENC circuit and supplies the signals U1' and V1' to be processed so as to be applied to the picture display member HDTV. The system encoding and decoding circuits ENC and DEC further comprise an encoding circuit DATV ENC and a decoding circuit DATV DEC, respectively, for processing data signals DS and for supplying data signals DS', respectively, the reference DATV standing in known manner for "Digitally Assisted TV". The output of the DATV ENC circuit is coupled to the MAC ENC circuit and the input of the circuit DATV DEC is coupled to the MAC DEC circuit.

In FIG. 1 the luminance signal YO (54 MHz) is applied to a signal processing circuit COR via a connection lead which, for the sake of simplicity, is shown as a single lead but which is a multiple lead. Further connection leads, inputs and outputs are shown in a single form but are multiple. It is assumed that the conventional signal processing operations are carried out in the circuit COR, such as, for example amplification, filtering and correction which is denoted in FIG. 1 by (COR. γ). The gamma correction is denoted by γ because its use is the basis of the invention, as will hereinafter be apparent. To accentuate its presence, the circuit COR is shown separately, but it may form part of the source DSS.

The multiple output of the circuit COR is coupled via multiple connection leads to three parallel picture signal channels PC1, PC2 and PC3 which are coupled by means of a time-division multiplex circuit MUX1 and are connected via this circuit to the MAC ENC circuit.

The picture signal channel PC1 is shown with a series arrangement of a low-pass filter LPF1, a sampling circuit SC1 shown as a switching circuit to which a sampling clock pulse signal CS is applied and a line shifting circuit LS1. The frequency of the clock pulse signal CS is equal to half the luminance sampling frequency. The known line shift is illustrated by means of a solid line and a dotted line and an arrow. Similarly, the channel PC2 comprises a low-pass filter LPF2, a sampling circuit SC2 and a line shifting circuit LS2. The picture signal channel PC3 comprises a switching circuit SC4 to which a switching signal VS shown, which occurs with a frame period (VT1+VT2), is applied, a low-pass filter LPF3 and a sampling circuit SC3 with the supply of the sampling clock pulse signal CS. The switching signal VS ensures that the YO signal is processed for one field period, for example, VT1 during each frame period. The switching circuit SC4 ensures a signal processing operation in accordance with the field skipping method in which each time one of two successive fields is transmitted (or stored).

The output of the low-pass filter LPF3 is coupled to an input of a motion detection device MOT. It is assumed that the device MOT locally detects motion in a picture to be displayed, while a motion signal S20, 40, 80 is generated when thresholds are exceeded, dependent on the extent of motion. An example is a motion signal S80, 40, 20 which is supplied if a motion is detected which is smaller or larger than a threshold value of 0.5 or 12 pixels per frame period of 2VT=40 ms. The motion signal S20, 40, 80 is applied to the circuit MUX1 in which an input terminal T20, T40, T80, respectively, is connected under the control of this circuit to an output terminal T0 via a switch. The circuit MUX1 applies a luminance signal Y1 (13.5 MHz) to the MAC ENC circuit. The digital luminance signal Y1 (13.5 MHz) at the sampling frequency of 13.5 MHz is composed of three sub-signals Y80, Y20 and Y40 which are supplied by the signal channels PC1, PC2 and PC3, respectively, with a signal refreshing period which is equal to 4VT=80 ms, 1 VT=20 ms and 2VT=40 ms, respectively. For the sake of simplicity the circuit MUX 1 is shown as a mechanical switch, but in practice it is in the form of an electronic multiplexer.

The motion detection device MOT not only supplies the motion signal S20, 40, 80 to be applied to the encoding circuit DATV ENC, but also supplies further information VR about motion vectors associated with the detection of exceeding the threshold values by 0.5 and 12 pixels per frame period.

The MAC DEC circuit supplies a digital signal Y1' (13.5 MHz) which is comparable to the signal Y1 (13.5 MHz), to three signal channels PC11, PC12 and PC13. Primed and unprimed signals are comparable. The channels PC11 and PC12 are essentially complementary, inversely operative with respect to the channels PC1 and PC2 and supply signals Y80' and Y20'. The channel PC11 comprises a series arrangement of a line shifting circuit LS11, a sample insertion circuit SC11 and a low-pass filter LPF11. The insertion of the samples is indicated by "0" and a change-over switch at the circuit SC11. The channel PC12 is implemented in the same manner with circuits LS12 and SC12 and a filter LPF12.

The signal channel PC13 comprises a sample insertion circuit SC13 and a subsequent low-pass filter LPF13. An output of the filter LPF13 is coupled to inputs of a switching circuit SC14, a picture signal memory MEM 2VT and a degamma corrector G1. Inputs of an interpolator INT are coupled to outputs of the corrector G1 and a degamma corrector G2 which is arranged subsequent to the memory MEM 2 VT. A control input of the interpolator INT received motion vector information VR' from the DATV DEC circuit. An output of the interpolator INT is coupled to an input of the switching circuit SC14 via a gamma corrector G3. A control input of this circuit receives a signal VS' which is comparable to the signal VS. The frame frequency switching circuit SC14 has an output conveying a signal Y40' which is coupled to an input terminal T40 of a multiplex circuit MUX11. The signals Y80' and Y20' are applied to input terminals T80 and T20 and under the control of a motion signal S20,40,80' supplied by the DATV DEC circuit, an output terminal supplies the signal YO' (54 MHz).

The signal channel PC13 of FIG. 1 comprises in the manner described a motion-compensated (VR') picture signal interpolation circuit (MEM, INT, G) which according to one aspect of the invention comprises a gamma compensation circuit G (G1, G2, G3). For the signal interpolation intended to form an intermediate field from the previous and subsequent fields which are only transmitted in accordance with the field skipping method, the memory MEM 2VT and the interpolator INT are essentially present. The memory MEM has a storage capacity or a delay time which is equal to or larger than two field periods. Line period memories may be present. FOr the explanation of the influence of the gamma compensation circuit G reference is made to FIG. 2.

Figure 2:
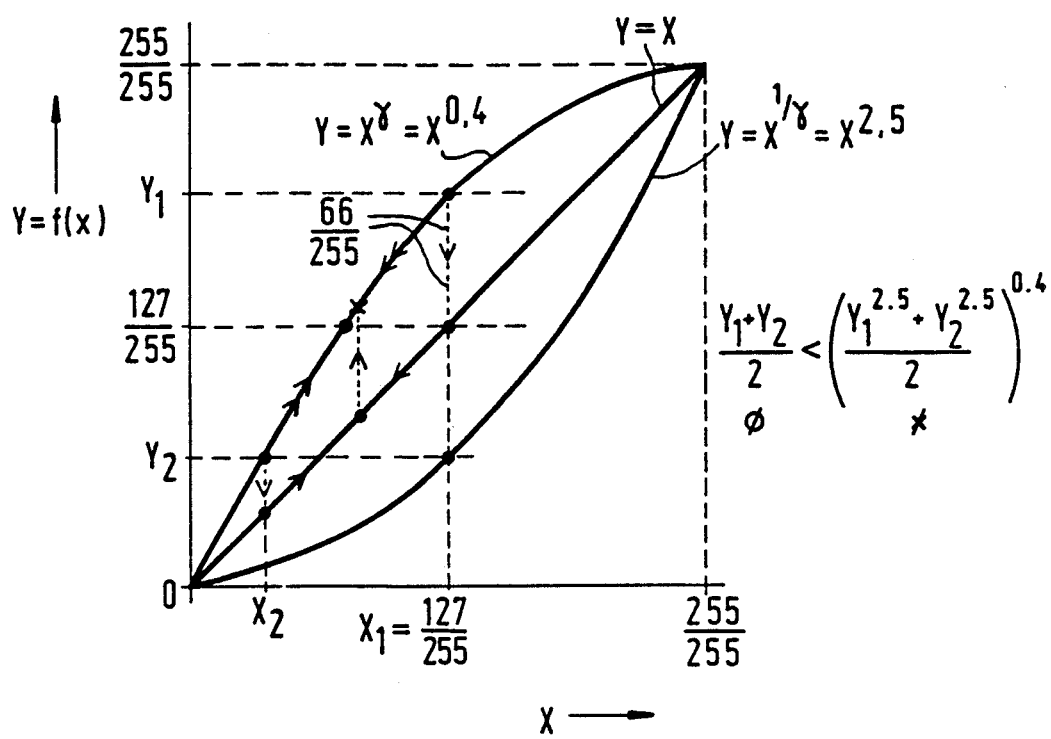
FIG. 2 shows some graphs to explain the recognition on which the invention is, inter alia based.

FIG. 2 shows some graphs in accordance with a function $y = f(x)$. The values of x and y are plotted along two perpendicular axes between 0 and $255/255 = 1$ as peak values. To emphasize that the values of x and y are digital and occur with e.g. 8 bits, the 0 to 255 notation is used. The reference $(x_1 =) 255/127$ denotes the half peak-to-peak value. Starting from $x_1$, two values $y_1$ and $y_2$ are plotted which occur in accordance with the function $y = x^\gamma = x^{0.4}$ and $y = x^{1/\gamma} = x^{2.5}$, respectively. Furthermore, $y_2 = x_2^{0.4}$ is plotted. The reference $y = x$ denotes the linear graph, at which $\gamma = 1$.

Without the presence of the correctors G1 and G2 of FIG. 1 the picture signal interpolation is effected in accordance with the relation $$\frac{y_1 + y_2}{2}$$

in which $y_1$ and $y_2$ are located on the graph $y = x^{0.4}$. In this case $y_1$ and $y_2$ correspond to picture signal values of pixels of the previous and subsequent field, while half the sum value represents the interpolated picture signal value of the pixel in the intermediate field. Starting from the values of $\frac{3}{4}$ and $\frac{1}{4}$ of the peak-to-peak value shown in FIG. 2, the value of 255/127 denoted by means of a circle follows via the path denoted by double arrow heads.

In the presence of the correctors $G1(1/\gamma)$, $G2(1/\gamma)$ and $G3(\gamma)$, the interpolation is effected in accordance with the relation $$\left[\frac{y_1^{2.5} + y_2^{2.5}}{2}\right]^{0.4}$$

In FIG. 2 the path followed between and in the graphs is shown by single arrow heads. It appears that an interpolation value denoted by a cross occurs at this path. The cross value which is correct is larger than the incorrect circle value. The maximum difference occurs for $y_1 = 1$ and $y_2 = 0$, or the other way around at which $\frac{1}{2} < (\frac{1}{2})^{0.4}$, i.e. $0.5 < 0.758$. This implies that for a pixel with a white value ($y_1 = 1$) in the previous field and a pixel with a black value ($y_2 = 0$) in the subsequent field an incorrect interpolation value which is 66% of the correct interpolation value is obtained without the use of gamma compensation. In a binary sense this is an incorrect value of 255/127 with respect to the correct value of 255/193, i.e. a difference of 255/66. FIG. 2 shows this maximum difference value. The maximum difference value of 255/66 corresponds to a binary difference of 66 least significant bits (LSB) for 8-bit words, i.e. to the bit word 01000010.

For the example with $y_1 = \frac{3}{4}$ and $y_2 = \frac{1}{4}$ shown in FIG. 2, a calculation results in 0.5 < 0.577, which means that the interpolation value is 13% too low without gamma compensation.

It appears that a transmitted field and an interpolated field are alternately displayed at which the interpolated pixel values are too low if the gamma compensation at the picture interpolation is not used. Dependent on the magnitude of the pixel contrasts (black-white is maximum) the differences upon display contribute to area flickering. The extent of area flickering is not only dependent on the high-frequency picture contents but also on possibly erroneous motion vector information. In practice, a troublesome area flickering appears to occur which can be prevented by the gamma compensation.

FIG. 1 shows the gamma compensation circuit G mainly with the two degamma correctors G1 and G2. According to one aspect of the invention the interpolator INT is thereby active with linearized picture signals. If the picture display member HDTV operates with a gamma which is equal to one, it is not necessary to use the gamma corrector G3 and, for example, a degamma corrector is present between the low-pass filter LPF13 and the switching circuit SC14. If the gamma of the picture display member HDTV is unequal to one, the gamma corrector G3 may be present in its simplest form in relation to the interpolated picture signal.

Figure 3:
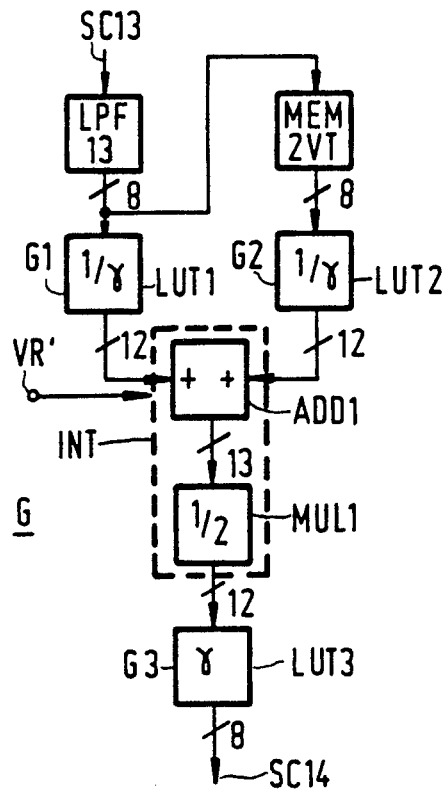
FIG. 3 shows in more detail a first embodiment of a gamma compensation circuit in a picture signal interpolation circuit according to the invention, operating with degamma correctors.

FIG. 3 shows a block diagram of a more detailed embodiment of a gamma compensation circuit G. Components described with reference to FIG. 1 are indicated in the same way in FIG. 3 and subsequent Figures. The correctors G1, G2 and G3 are denoted by LUT1, LUT2 and LUT3, respectively, so as to indicate that each of them is in the form of a digital device operating with a Look-Up Table. Multiple connection leads are denoted in FIGS. 3, 4 and 5 by the reference numerals 8, 9, 12 and 13 to illustrate the processing of an original e.g. 8-bit word. The interpolator INT of FIG. 1 is shown diagrammatically with, inter alia a digital adder ADD1 and a subsequent multiplier MUL1 with a factor of $\frac{1}{2}$. The supply of the vector information VR' to the interpolator INT is shown diagrammatically. FIG. 3 shows that the use of three LUT devices and a twice 12-bit instead of a twice 8-bit adder may be sufficient for the gamma compensation at the picture interpolation. The gamma compensation circuit G according to FIG. 3 is formed as a circuit (LUT1, LUT2) and (LUT1, LUT2, LUT3), respectively.

Figure 4:
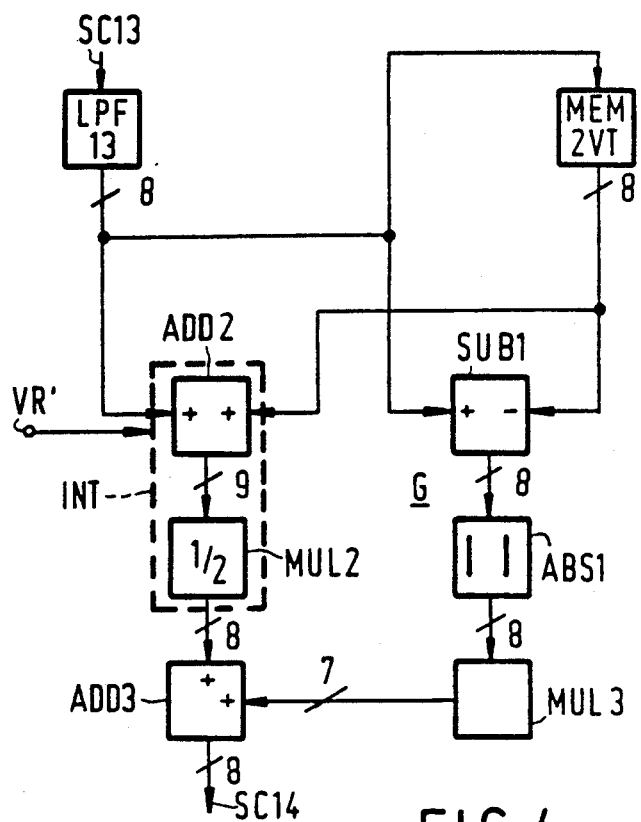
FIG. 4 shows a second embodiment operating with a compensation value which is dependent on the pixel contrast at the picture interpolation and FIG. 5 shows a third embodiment operating with a compensation value which is dependent on the pixel contrast at the picture interpolation and on the local brightness in the picture.
Figure 5:
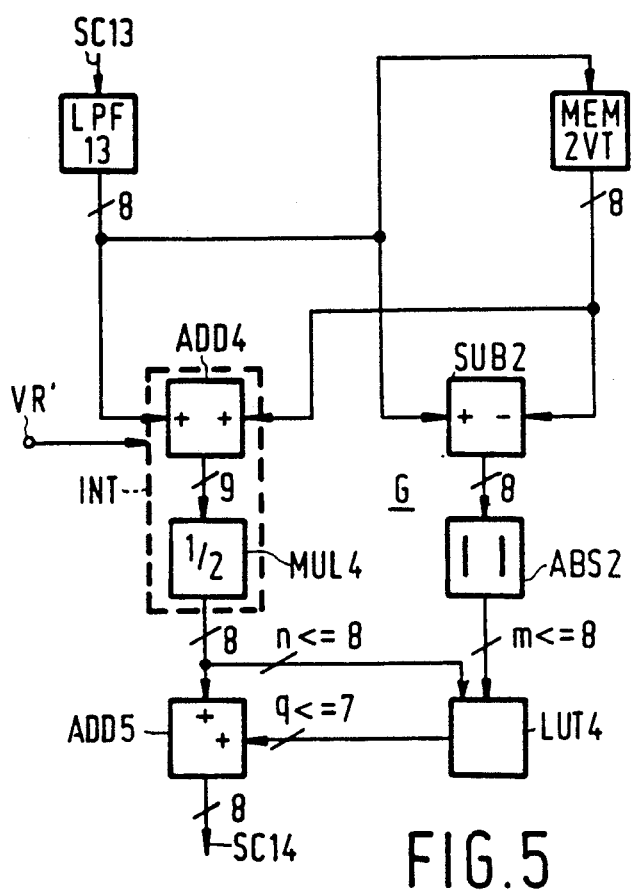

For FIG. 3 and the subsequent FIGS. 4 and 5 it holds that the shown sequence of adding or subtracting, multiplying etc. may be reversed. The appended claims are to be considered as to encompass these alternatives.

FIG. 4 shows an embodiment in which linearization does not take place before the picture interpolation but one which operates with a compensation value which is dependent on the pixel contrast at the picture interpolation. It is apparent from the description of FIG. 2 that it always holds that the incorrect interpolation value is smaller than the correct interpolation value, the difference value being dependent on the pixel contrast and varying between 0 and 255/66 = 0.259 of the peak-to-peak value. On this basis the inputs of the interpolator INT which comprises, inter alia an adder ADD2 and a multiplier MUL2 with a factor of $\frac{1}{2}$, is coupled to inputs of a subtractor SUB1 which is followed by an absolute value former ABS1 and a multiplier MUL3 with a factor of $\frac{1}{4}$. Inputs of an adder ADD3 are coupled to outputs of the interpolator INT and a series arrangement of subtractor, absolute value former and multiplier (SUB1, ABS1, MUL3). As a result the incorrect interpolation value obtained by the picture interpolation is raised by a compensation value which is dependent on the pixel contrast, namely by the multiplication factor of $\frac{1}{4}$ which is approximately equal to the described factor of 0.259. This provides the advantage of a signal processing with at most one 9-bit word and the absence of LUT devices. If desired, the multiplication factor may be given a value of the order of one fourth. A reduction of the area flickering across the said 66 LSBs by a factor of approximately 4 leads to a area flickering across 17 LSBs corresponding to the bit word 00010001. The gamma compensation circuit G according to FIG. 4 is in the form of a circuit (SUB1, ABS1, MUL3, ADD3).

Although the above theoretical analysis indicates that an optimum value of the multiplication factor of multiplier MUL3 would be $\frac{1}{4}$, experiments have surprisingly shown that in certain circumstances this factor of $\frac{1}{4}$ yielded an increase instead of a decrease of the disturbing flicker phenomenon, while a factor of $\frac{1}{8}$ yielded far better results. Experiments have further shown that also a factor of 3/16 yields far better results than the factor of $\frac{1}{4}$, while no differences can be noticed between the respective results yielded by the factor of 3/16 and the factor of $\frac{1}{8}$. A system in which the factor of $\frac{1}{8}$ is chosen if the output signal of absolute value former ABS1 is below 128 LSBs, and the factor of $\frac{1}{4}$ is chosen if the output signal of absolute value former ABS1 is above 128 LSB2, yields about the same results as a fixed factor of 3/16. In order to obtain a simple hardware realization, a fixed factor of $\frac{1}{8}$ is preferred.

A further approximation of the optimum compensation value can be realised in accordance with the block-schematic diagram of FIG. 5. In this case the compensation value is dependent on the pixel contrast at the picture interpolation as well as on the local brightness in the picture. The interpolator INT comprises, inter alia an adder ADD4 and a multiplier MUL4 with a factor of $\frac{1}{2}$. The gamma compensation circuit G comprises a subtractor SUB2 with inputs which are coupled to the interpolator inputs and which is followed by an absolute value former ABS2. An output of the absolute value former ABS2 is coupled to an input of a digital device LUT4 which operates with a look-up table and another input of which is coupled to an interpolator output and an output is coupled to an input of an adder ADD5 another input of which is coupled to the interpolator output. The references $m <= 8$, $n <= 8$ and $q <= 7$ at the multiple inputs and the output of the device LUT4 indicate that a number of m, n and q most significant bits (MSB) are used for the compensation value for the adder ADD5. Computations by means of a computer program have led to the following Table:

TABLE

| n MSB | m MSB | q MSB | maximum deviation in bits |
|---|---|---|---|
| 8 | 8 | 7 | 0 |
| 6 | 6 | 7 | 2 |
| 6 | 6 | 6 | 3 |
| 3 | 4 | 7 | 8 |

TABLE-continued

| n MSB | m MSB | q MSB | maximum deviation in bits |
|---|---|---|---|
| 3 | 4 | 6 | 8 |

The table shows that there is a jump between the deviations, namely between 3 and 8 bits, i.e. between a bit word 0011 and a bit word 1000. For obtaining the minimum bit deviation of 0, 2 or 3 bits the device LUT4 is preferred which operates with a number of output bits (7 or 6) which is equal to or differs by one bit from numbers of input bits (8 or 6). The gamma correction circuit G according to FIG. 5 is in the form of a circuit (SUB2, ABS2, LUT4, ADD5).

Another approximation of the gamma compensation can be performed by expressing the power function given in FIG. 2 and leading to the correct cross value in a polynomial with variables of the sum value $y_1 + y_2$ and the absolute value of the difference value $y_1 - y_2$. This polynomial then leads to the optimum contents of a LUT device.

The picture signal interpolation circuit according to the invention, which mainly comprises the memory MEM, the interpolator INT and the gamma compensation circuit G is characterized by the last-mentioned circuit.

We claim:

1. Picture signal interpolation circuit, comprising:
   means for receiving a picture signal encoded in accordance with a field skipping method, and
   means coupled to said receiving means for interpolating said picture signal to obtain interpolated fields between a plurality of received fields of said picture signal, wherein said picture signal interpolation circuit is provided with a gamma compensation circuit.

2. A picture signal interpolation circuit as claimed in claim 1, wherein said picture signal interpolating means include a picture signal memory having a memory capacity or delay time which is equal to or larger than two field periods and an interpolator which is coupled to output and input of the memory.

3. A picture signal interpolation circuit as claimed in claim 2, wherein the gamma compensation circuit comprises a first and a second degamma corrector each having an output coupled to a respective input of the interpolator.

4. A picture signal interpolation circuit as claimed in claim 3, wherein the gamma compensation circuit comprises a gamma corrector an input of which is coupled to an output of the interpolator.

5. A picture signal interpolation circuit as claimed in claim 3, wherein said correctors are digital devices having a look-up table.

6. A picture signal interpolation circuit as claimed in claim 2, wherein the gamma compensation circuit comprises a digital subtractor, inputs of which are coupled to inputs of the interpolator, an output of the subtractor being coupled to an absolute value former and multiplier, an output of which is coupled to an input of an adder, another input of which is coupled to an output of the interpolator.

7. A picture signal interpolation circuit as claimed in claim 6, wherein the multiplier has a multiplication factor of the order of one eighth.

8. A picture signal interpolation circuit as claimed in claim 2, wherein the gamma compensation circuit comprises a digital subtractor, inputs of which are coupled to inputs of the interpolator, an output of the subtractor being coupled to an absolute value former, an output of which is coupled to an input of a digital device having a look-up table, another input of said digital device being coupled to an output of the interpolator, and an output of said digital device being coupled to an input of an adder, another input of which is coupled to said interpolator output.

9. A picture signal interpolation circuit as claimed in claim 8, wherein the digital device has a number of output bits which is equal to or differs by one bit from numbers of input bits.

10. A picture signal interpolation circuit as claimed in claim 4 wherein said correctors are digital devices having a look-up table.

* * * * *